Aug. 7, 1923.
R. M. LANGDON
1,464,080
VACUUM PUMPING ATTACHMENT FOR MOTOR VEHICLES
Filed April 19, 1920
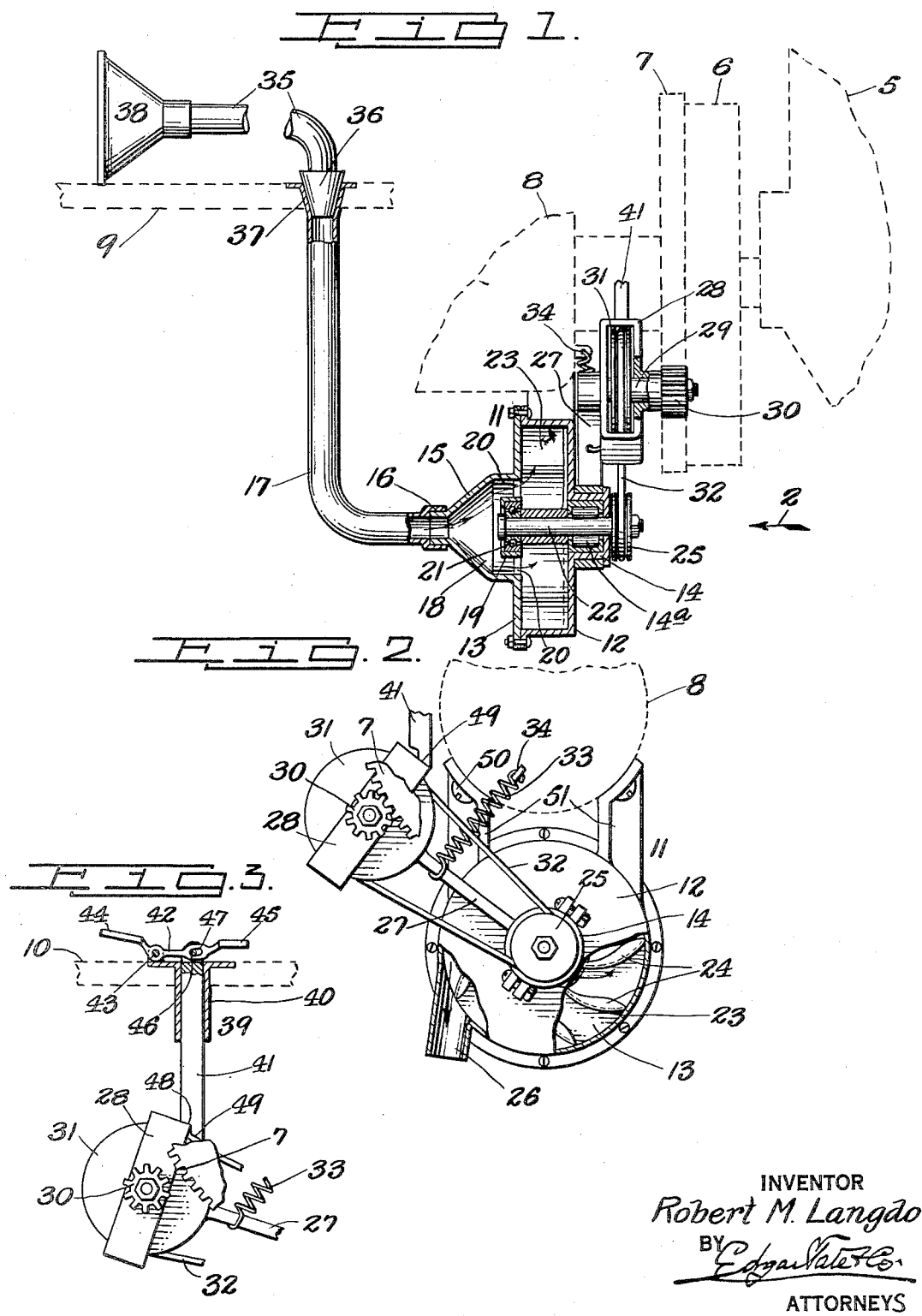
INVENTOR
Robert M. Langdon,
BY
Edgar Tate & Co.
ATTORNEYS Patented Aug. 7, 1923.

1,464,080

UNITED STATES PATENT OFFICE.

ROBERT M. LANGDON, OF ENGLEWOOD CLIFFS, NEW JERSEY.

VACUUM PUMPING ATTACHMENT FOR MOTOR VEHICLES.

Application filed April 19, 1920. Serial No. 374,938.

*To all whom it may concern:*

Be it known that I, ROBERT M. LANGDON, a citizen of the United States, and residing at Englewood Cliffs, in the county of Bergen and State of New Jersey, have invented certain new and useful Improvements in Vacuum Pumping Attachments for Motor Vehicles, of which the following is a specification, such as will enable those skilled in the art to which it appertains to make and use the same.

This invention relates to vacuum attachments and particularly to apparatus of this class designed for use in connection with motor vehicles, for the purpose of removing dust, dirt and other foreign matter from various parts of the car and discharging the same onto the ground or other surface upon which the vehicle is resting; and the object of the invention is to provide an attachment of the class specified which is mounted in connection with or in juxtaposition to the driving mechanism of a vehicle of the class specified or a rotatable member of such mechanism; a further object being to provide means movable into and out of engagement with said mechanism or a rotatable member thereof, whereby the vacuum attachment may be operated; a further object being to provide means for holding the vacuum operating means in and out of engagement with said driving mechanism or a rotatable member thereof; and with these and other objects in view the invention consists in a vacuum attachment of the class specified which is simple in construction and operation and efficient in use and constructed and operated as hereinafter described and claimed.

The invention is fully disclosed in the following specification, of which the accompanying drawing forms a part, in which the separate parts of my improvement are designated by suitable reference characters in each of the views, and in which:—

Fig. 1 is a diagrammatic view showing my improved vacuum attachment mounted in connection with a motor vehicle and indicating one method of its use;

Fig. 2 a view looking in the direction of the arrow 2 of Fig. 1 and showing a portion of a rotatable member, indicated in Fig. 1. in full lines; and, Fig. 3 a view similar to Fig. 2 but showing only a part of the construction and showing other details not shown in said figure and with parts in a different position.

In Fig. 1 of the drawing, I have indicated in dotted lines at 5 a portion of the engine of a motor vehicle, at 6 the fly wheel of such engine having on its periphery a gear portion 7 and rearwardly of the fly wheel 6 is a gear or other housing 8 also indicated in Fig. 2, and at 9 is indicated a portion of the floor of the motor vehicle, preferably rearwardly of the front seat of such vehicle, and in Fig. 3 I have indicated at 10 another portion of the floor which is located forwardly of the front seat of the vehicle or in the driver's compartment.

My improved vacuum attachment 11 may be made as an attachment to a motor vehicle, or may be built into and form a part of such vehicle. The attachment comprises a fan casing 12, having a detachable cover 13 at one side thereof, and said casing is provided at the opposite side with an extension 14 in which is mounted a bearing 14$^a$, and the cover 13 is provided with an outwardly directed and conically formed extension 15 having a reduced neck 16 with which a pipe 17 is connected. Mounted within a chamber 18 formed in the conical extension 15 is a sleeve 19 supported and spaced in said chamber by a plurality of wedges 20, any number of which may be employed, and mounted in the sleeve 19 is a bearing 21.

The shaft 22 is mounted in the bearings 14$^a$ and 21, and secured to said shaft within the casing 12 is a fan device 23, having a plurality of blades 24. The shaft 22 extends through the extension 14 and secured to the extended portion of said shaft is a grooved wheel or pulley 25. The casing 12 is provided in the periphery thereof with an outwardly and downwardly directed discharge 26 through which air and other foreign matter drawn into the casing 12 through the chamber 18 by the fan device 23 is adapted to pass.

Rotatably mounted on the extension 14 of the casing 12 is an arm 27, the outer or free end of which carries a yoke device 28 in which a shaft 29 is rotatably mounted. The shaft 29 extends through one side of the yoke device 28 and is provided in the construction shown with a pinion 30 adapted to mesh with the gear 7 of the fly wheel 6 as is indicated in Fig. 2, in which figure a portion of the gear 7 is shown in full lines. A grooved wheel or pulley 31 is secured to the shaft 29 within the yoke device 28 and a suitable belt 32 is passed around the wheel or pulley 31 and around the wheel or pulley 25, as is clearly illustrated in Figs. 1 and 2. A spiral spring 33 is connected with the arm 27 and with the housing 8 or any other stationary support of the vehicle as shown at 34.

The pipe 17 which is connected with the extension 15 extends upwardly and is preferably mounted in the floor board 9 of the vehicle, which is indicated in Fig. 1 of the drawing. A flexible hose 35 such as that commonly employed in vacuum apparatus is adapted to be connected or coupled with the pipe 17 and in the construction shown, one end of this hose is provided with a conical coupling member 36 which fits in the conical end 37 of the pipe 17 and the free end of the hose 35 is provided with a vacuum cleaning nozzle or similar attachment 38. It will be understood that any form of vacuum nozzle or cleaning attachment may be employed and connected or coupled with the pipe 17 in any desired manner.

The means for driving or rotating the fan device 23, comprising the wheels 25—31, belt 32 and pinion 30, are adapted to be normally held in operative position, or with the pinion 30 in mesh with the gear 7 of the fly wheel 6 by the spring 33, and in order to hold said mechanism out of operative position when it is not desired to use the vacuum attachment, a suitable catch or lock device 39 is employed. This device comprises a sleeve 40 mounted in the floor board 10 shown in Fig. 3, a lock rod 41 movable vertical in the sleeve 40 and an operating lever 42 pivoted to the top face of the sleeve 40 as shown at 43. The opposite ends of the lever 42 are provided with enlarged heads 44 and 45 respectively. The upper end portion of the lock rod 41 is connected with the lever 42 by a pin 46 passed through an elongated slot 47 in one end portion of said lever. The lower end portion of the lock rod 40 is provided with a notch 48 and with a beveled face 49.

In Fig. 3 of the drawing the catch or lock device 39, or the various parts thereof, are shown in their inoperative position, in which position the arm 27 has been depressed and the yoke device 28, or a corner portion thereof, rests within the notch 48 of the lock rod 41, and in this position of the parts it will be seen that the pinion 30 is held out of engagement with the gear 7 on the fly wheel 6, and the operation of the vehicle or the motor will not be transmitted to the fan device 23. When it is desired to put the vacuum attachment into operation, the head end 44 of the lever 42 is depressed by the foot of the operator to raise the lock rod 41 in the sleeve 40 and the spring 33 will then move the arm 27 and the various parts mounted in connection therewith into the position shown in Fig. 2, and with the pinion 30 in mesh with the gear 7, and if the engine of the vehicle be in operation the rotation of the fly wheel 6 with the gear 7 thereon will rotate the shaft 29 through the pinion 30, which operation rotates the grooved wheel 31, and the fan device 23 within the casing 12 will be rotated through the belt 32 and grooved wheel 25 which is secured to the shaft 22 to which the fan device is also secured. It will be understood that by suitable gearing or reduction in gearing the fan device 23 may be rotated at a comparatively high speed, or at the speed required to cause a sufficient suction in the pipe 17, and in this way dust, dirt and other foreign and undesirable matter in or on a motor vehicle, or the various parts thereof, may be removed by a suitable attachment on the end of the hose 35, and such matter discharged onto the ground or floor through the discharge 26 of the casing 12. It will be apparent that by providing an attachment of the class specified a very efficient means will be provided for doing away with the dust and dirt which constantly collects in or on a motor vehicle, and this result may be accomplished without the loss of much time or labor.

It will be understood that after the vacuum attachment has been used, and it is desired to lock the same in inoperative position, the head end portion 45 of the lever 42 will be depressed and, in this operation, the beveled face 49 of the lock rod 41 will operate upon the face of the yoke device 28 to depress the arm 27 into the position shown in Fig. 3.

In the accompanying drawing, I have shown the casing 12 mounted in connection with the housing 8 by screws or similar device 50 passed through upwardly directed arms or extensions 51 of the casing 12, but it will be understood that any means may be provided for connecting the casing 12 with a suitable stationary support, or said casing or the means for supporting the same may be built in and form a part of the vehicle. It will also be apparent that while I have shown the pinion or gear 30 on the end of the shaft 29 operating in connection with the gear face 7 on the fly wheel 6, any suitable means may be provided for rotating the shaft 21, such for example as friction disks or wheels and like means common in various apparatus of this class. In other words, I am not necessarily limited to the use of this attachment in connection with vehicles, the fly wheels of which are provided with gear faces as the fly wheels of many makes of vehicles are differently constructed, and it will also be understood that the shaft 29, or the shaft 22, may be driven through or by means of any desired rotatable member on a motor vehicle and need not necessarily be operated through the fly wheel, and various other changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. A vacuum apparatus for motor vehicles adapted to operate in connection with a rotatable element of a vehicle and comprising a casing, a fan rotatably mounted in said casing, means for admitting air to the casing, means for discharging air therefrom, a member rotatably mounted in connection with said casing and adapted to swing in an arc having an axis common with the axis of said fan, means carried by said member and in operative connection with said fan whereby said fan may be rotated, tensional means for holding said last named means in operative connection with the rotatable element of the vehicle, means operating in connection with said member for moving the same and the fan operated means carried thereby into inoperative position and for holding the same in such position, a suction pipe connected with said casing and extending to a predetermined point on the vehicle, and means for connecting vacuum cleaning attachments with the free end portion of said suction pipe whereby dust and dirt may be removed from various parts of the vehicle to which the apparatus is applied.

2. A vacuum apparatus for cleaning motor vehicles adapted to operate in connection with a rotatable element of the vehicle, and comprising a casing, means for admitting air into the central portion of said casing, means for discharging air through the periphery of said casing, a shaft rotatably mounted in said casing and extending through one side thereof, a fan mounted on said shaft within said casing, an arm rotatably mounted in connection with said casing, a shaft mounted in the free end portion of said arm, means for gearing said first named shaft in connection with said last named shaft, means on said last named shaft adapted to operate in connection with the rotatable element of the vehicle for rotating said fan, tensional means for holding said last named means in operative position, a member adapted to move said arm and the means carried thereby into inoperative position and to hold the same in such position, a suction pipe connected with said casing and extending to a predetermined point on the vehicle, and means for connecting vacuum cleaning attachments with the free end portion of said suction pipe whereby dust and dirt may be removed from various parts of the vehicle to which the apparatus is applied.

3. The combination with a motor vehicle of a unitary vacuum apparatus comprising a suction element, means on said element adapted to cooperate with a rotatable member of the vehicle for operating said suction element, and means mounted in the structure of the vehicle and communicating with said suction element with which vacuum cleaning attachments may be coupled for the purpose of removing dust and dirt from various parts of the vehicle in connection with which the apparatus is mounted.

4. The combination with a motor vehicle of a unitary vacuum apparatus comprising a suction element, means on said element adapted to cooperate with a rotatable member of the vehicle for operating said suction element, means mounted in the structure of the vehicle and communicating with said suction element with which vacuum cleaning attachments may be coupled for the purpose of removing dust and dirt from various parts of the vehicle in connection with which the apparatus is mounted, and means for controlling the operation of said first named means.

5. The combination with a motor vehicle of a unitary vacuum apparatus comprising a suction element, a suction pipe coupled with said element, means for placing said element in operative connection with a rotatable member of the vehicle, and said suction pipe being provided at a predetermined point on the vehicle with a coupling end with which vacuum cleaning attachments are adapted to be coupled for the purpose of removing dust and dirt from various parts of the vehicle.

6. A vacuum cleaning unit for motor vehicles comprising a suction element adapted to be mounted in juxtaposition to a rotatable member of the vehicle, means for coupling said suction element with said rotatable member for operating said suction element at will, and means at a predetermined point on the vehicle and in communication with said suction element for coupling vacuum cleaning attachments therewith for the purpose of removing dust and dirt from various parts of the vehicle when the suction element is in operation.

In testimony that I claim the foregoing as my invention I have signed my name in presence of the subscribing witnesses this 15th day of April 1920.

ROBERT M. LANGDON.

Witnesses:
C. E. MULREANY,
H. E. THOMPSON.